(12) United States Patent
Tetzlaff

(10) Patent No.: US 6,505,600 B1
(45) Date of Patent: Jan. 14, 2003

(54) DIRECT INJECTION TWO STROKE ENGINE COMBUSTION MAPPING

(75) Inventor: Patrick C. Tetzlaff, Franklin, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/707,231

(22) Filed: Nov. 6, 2000

(51) Int. Cl.[7] ............................................. F02B 17/00
(52) U.S. Cl. ....................... 123/295; 123/73 C; 123/305
(58) Field of Search ................................. 123/295, 305, 123/430, 73 C

(56) References Cited

U.S. PATENT DOCUMENTS

| | | | |
|---|---|---|---|
| 5,078,107 A | | 1/1992 | Morikawa |
| 6,062,190 A | | 5/2000 | Nakajima |
| 6,065,443 A | * | 5/2000 | Mizuno et al. ............. 123/295 |
| 6,152,102 A | * | 11/2000 | Ruman ....................... 123/295 |

* cited by examiner

Primary Examiner—Willis R. Wolfe
Assistant Examiner—Johnny H. Hoang
(74) Attorney, Agent, or Firm—Pillsbury Winthrop LLP

(57) ABSTRACT

A control unit is provided for an internal combustion engine including an engine block comprising a plurality of cylinders operable in a homogenous combustion mode and a stratified combustion mode in response to an engine throttle position. The control unit is programmed to switch the engine cylinders to the homogenous combustion mode at a throttle position of greater than about 20% of wide open throttle. As such, the combustion mode is switched form the stratified combustion mode to the homogenous combustion mode at a higher throttle opening that more capably supports increased fuel injection quantities of homogenous combustion in the engine cylinders. Problematic conditions of conventional pontoon boat systems due to switching of engine cylinders to homogenous combustion at high RPMs and restricted throttle openings is therefore avoided.

20 Claims, 3 Drawing Sheets

DIRECT INJECTION TWO STROKE ENGINE COMBUSTION MAPPING

BACKGROUND OF THE INVENTION

This invention relates generally to systems for controlling an internal combustion engine, and more specifically, to a system for optimizing engine cylinder combustion in a direct injection two stroke engine.

Many known internal combustion engines include an electronic control unit (ECU) for controlling at least some operations of the engine. In a typical implementation, an ECU is electrically connected to engine components such as the engine ignition, lubrication pumps, water circulation system (if any) and fuel injectors. The ECU controls operational parameters, such as timing of the engine ignition and fuel injection, in accordance with a pre-programmed control program according to predetermined values or setpoints stored in system memory and dependant upon an operational state of the engine. The ECU looks up one or more of the stored parameter values corresponding to a state determined by various transducers or sensors, and other parameters are calculated, corrected, or adjusted based upon the engine parameter values stored in system memory so that the engine is operated at optimal levels, or nearly optimal levels, at all stages of operation.

In at least some engine applications, however, such as in marine engine outboard motors, these control schemes can be problematic because a given motor may be used in conjunction with various boat platforms that uniquely impact motor operation. In some applications, such as pontoon boats, actual engine operation is less than optimal in certain operating ranges, particularly at high RPM (e.g. 3500 to 4500 RPM) and low loads (e.g., about 15% of wide open throttle), while in other operating ranges, optimal engine operation is achieved without modification of the predetermined system values.

BRIEF SUMMARY OF THE INVENTION

In an exemplary embodiment of the invention, a control unit is provided for an internal combustion to avoid problematic operating conditions in certain applications, such as when the engine is used with a pontoon boat. The engine includes an engine block comprising a plurality of cylinders, and each of the cylinders is operable in a homogenous combustion mode and a stratified combustion mode in response to an engine throttle position. The control unit is programmed to control each of the cylinders to operate in the stratified combustion mode at throttle positions of up to about 20% of wide open throttle; and to switch one of the cylinders to the homogenous combustion mode at a throttle position of about 20% of wide open throttle. As such, the combustion mode is switched from the stratified combustion mode to the homogenous combustion mode at a higher throttle opening that more capably supports increased fuel injection quantities of homogenous combustion in the engine cylinders. Problematic conditions of conventional systems due to switching of engine cylinders to homogenous combustion at restricted throttle openings is therefore avoided, a problem which is magnified at higher RPMs encountered near the cylinder switch points in pontoon boat applications.

More specifically, in a four cylinder embodiment, each of the engine cylinders are switched from the stratified combustion mode to the homogenous combustion mode at throttle positions of about 20% to about 42%, and then operated in the homogenous combustion mode at throttle positions greater than about 42% of wide open throttle. Thus, less than optimal engine operating ranges in pontoon boat applications are avoided, and improved performance in pontoon boat applications is achieved.

DETAILED DESCRIPTION OF THE INVENTION

Figure 1:
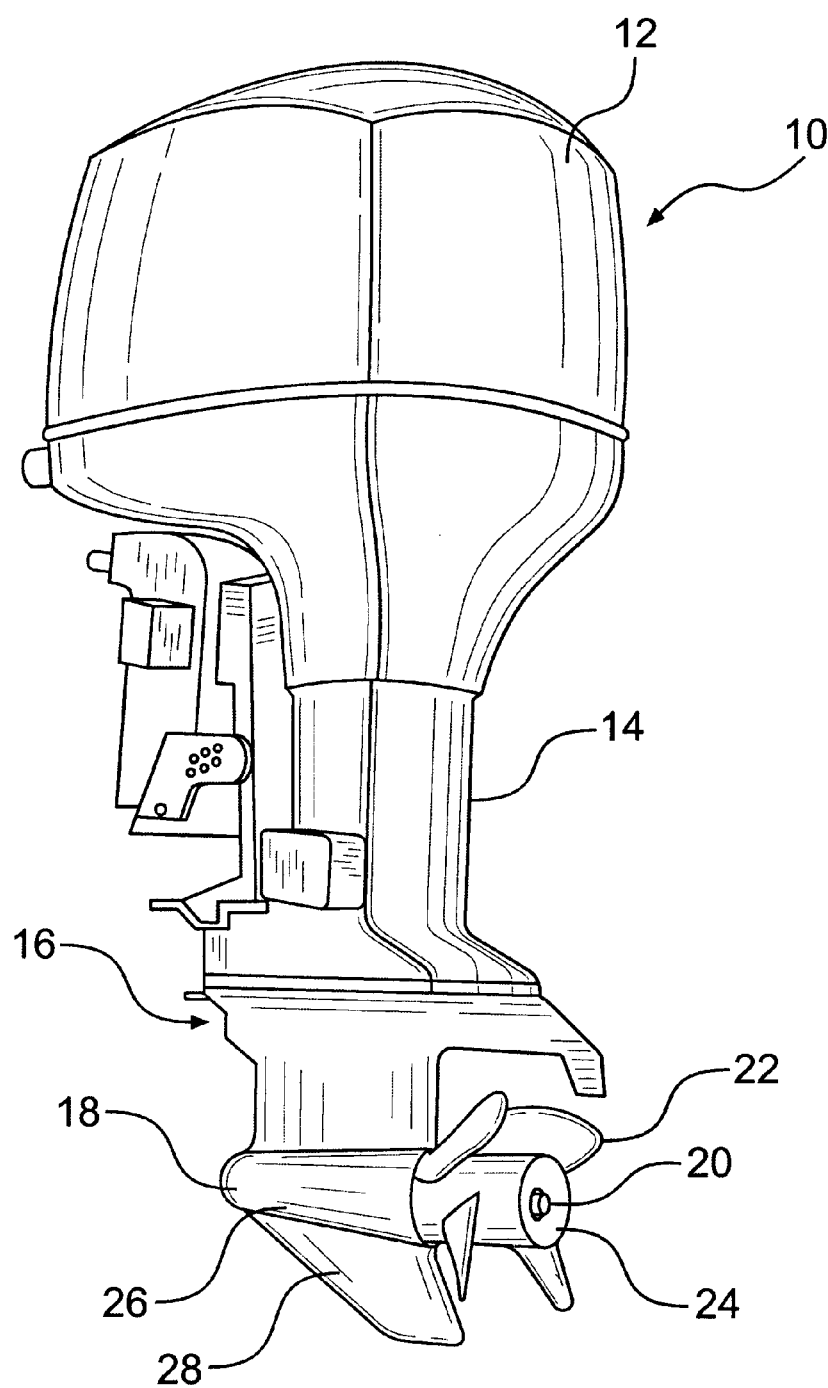
FIG. 1 is a perspective view of an exemplary outboard motor.

FIG. 1 is a perspective view of an exemplary outboard motor 10, such as an outboard engine commercially available from Outboard Marine Corporation, Waukegan, Ill. Motor 10 includes a cover 12 which houses a power head (not shown), an exhaust housing 14, and a lower unit 16. Lower unit 16 includes a gear case 18 which supports a propeller shaft 20. A propeller 22 is engaged to shaft 20. Propeller 22 includes an outer hub 24 through which exhaust gas is discharged. Gear case 18 includes a bullet, or torpedo, 26 and a skeg 28 which depends vertically downwardly from torpedo 26.

The power head includes an internal combustion engine (not shown in FIG. 1) having a drive shaft (not shown) which engages a gear set in gear case 18 and causes propeller shaft 20 to rotate. As propeller shaft 20 rotates, a thrust is developed to propel a watercraft (not shown) or vessel to which outboard motor 10 is attached. An air intake system (not shown in FIG. 1) includes an air inlet (not shown in FIG. 1) in flow communication with the atmosphere for intake of air into the cylinders of the engine. Air is passed into the engine cylinders and fuel is directly injected into the engine cylinders for combustion.

Figure 2:
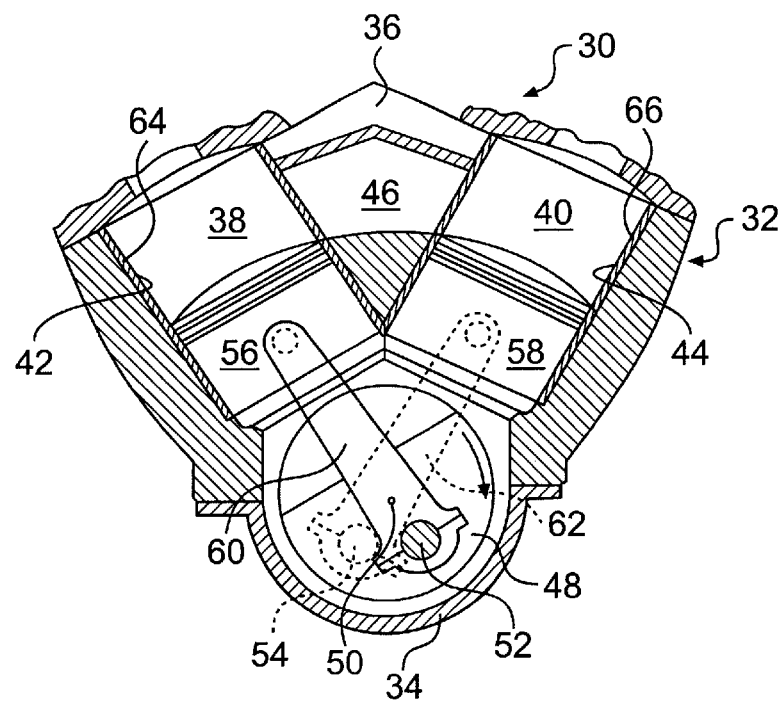
FIG. 2 is a schematic, partial cross-sectional illustration of a known internal combustion engine for the outboard motor shown in FIG. 1.

FIG. 2 is a schematic, partial cross sectional illustration of a portion of a known direct-injected internal combustion engine 30 for marine use, such as, for example, for use with outboard motor 10 (shown in FIG. 1). Engine 30 is shown schematically and primarily to describe one known engine configuration. The present invention is not limited to practice in engine 30, and can be used in connection with other engine arrangements. For example, although the present invention is described herein in connection with a single fluid, pressure surge direct in-cylinder fuel injection system, the invention can be used in connection with other fuel injection systems including, for example, dual fluid, air-assisted direct in-cylinder fuel injection systems.

In addition, and although the engine control apparatus and methods are described herein in the context of a marine engine, the apparatus and methods have utility, and may be used in connection with, direct-injected internal combustion engines for other applications of direct injection two stroke motors. Therefore, the present invention is not limited to practice in connection with marine applications, and can be used in many other applications. In addition, the present invention is equally applicable to four cylinder and six cylinder direct injected two stroke engines.

Also, the terms "stratified combustion" and "homogenous combustion" as used herein are not strictly limited to pure stratified combustion and pure homogenous combustion. Generally, there is a transition between pure stratified and pure homogenous combustion. Therefore, the term stratified combustion refers both to pure stratified combustion and combustion which is more stratified than homogenous, and the term homogenous combustion refers to both pure homogenous combustion and combustion which is more homogenous than stratified.

Referring now to FIG. 2, engine 30 includes a cylinder block 32 having a crankcase 34. Cylinder block 32 also includes a main exhaust passageway 36 intermediate first and second cylinders 38 and 40 which extend radially from crankcase 34. Cylinders 38 and 40 include cylinder walls 42 and 44, respectively. Block 32 further includes a water passageway 46 intermediate cylinders 38 and 40.

A crankshaft 48 is supported in crankcase 34 for rotation about a crankshaft axis 50. Angularly spaced first and second crankpins 52 and 54 are coupled to crankshaft 48. Pistons 56 and 58 are connected to crankpins 52 and 54 by connecting rods 60 and 62. Pistons 56 and 58 are reciprocally movable in first and second cylinders 38 and 40 toward and away from crankshaft 48 and between top dead center and bottom dead center positions. Sleeves 64 and 66 are located in cylinders 42 and 44, and pistons 56 and 58 are in sliding contact with sleeves 64 and 66.

Figure 3:
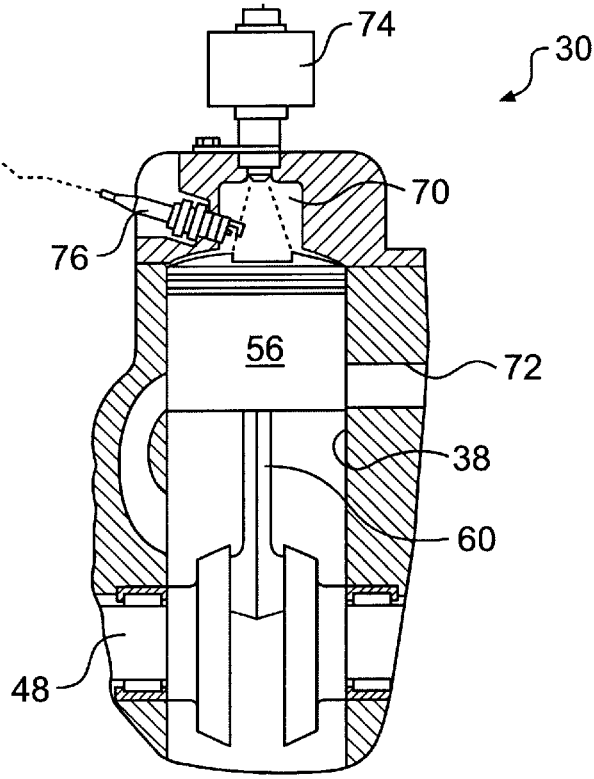
FIG. 3 illustrates a cylinder of the engine shown in FIG. 2.

FIG. 3 illustrates, in more detail, cylinder 38 of engine 30. Cylinder 38 includes a combustion chamber 70, and an exhaust manifold 72 communicates with combustion chamber 70. A fuel injector 74 communicates directly with combustion chamber 70 and periodically injects fuel unmixed with air directly in chamber 70. A spark plug 76 extends into combustion chamber 70, and is operable to periodically ignite the fuel charges in combustion chamber 70. A control unit 78, which in one embodiment includes an electronic control unit (ECU), controls operations of injector 74 and spark plug 76. Additional details regarding the above described engine components are set forth, for example, in U.S. Pat. No. 5,730,099, which is assigned to the present assignee.

Figure 4:
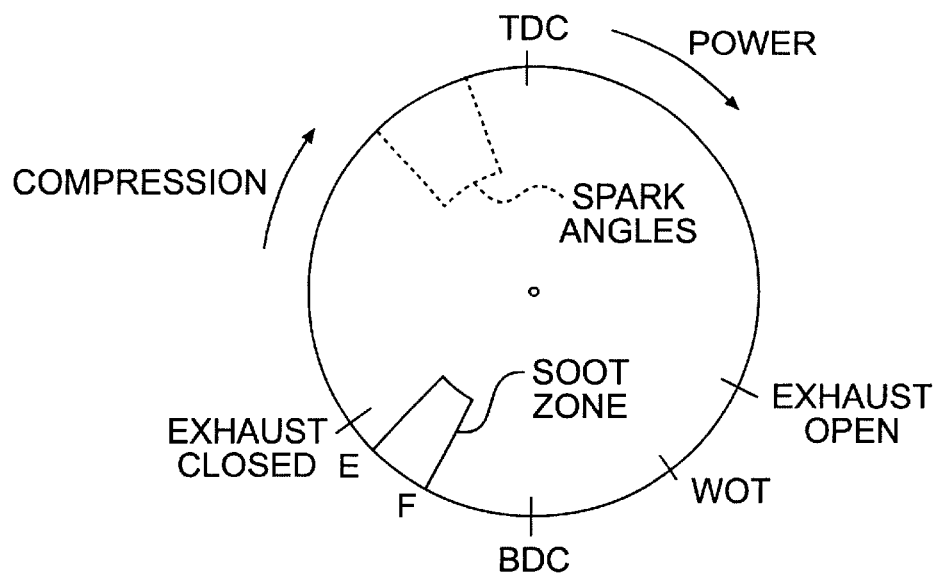
FIG. 4 is a graphical representation of one complete revolution of an engine crankshaft with respect to the location of a piston in a cylinder.

FIG. 4 is a graphical representation of one complete revolution of crankshaft 48 (shown in FIG. 2) with respect to the location of piston 56 in cylinder 38 (shown in FIG. 3). In FIG. 4, and starting with piston 56 located at top dead center (TDC), piston 56 is drawn toward crankshaft 48 in a power stroke. At a predefined angle from TDC, piston 56 moves below exhaust port 72 (shown in FIG. 3) and exhaust port 72 is open so that exhaust can exit cylinder 38. Piston 56 then reaches bottom dead center (BDC) and begins moving away from crankshaft 48. A combustion soot zone is located between BDC and the piston position at which exhaust port 72 is closed. The compression stoke then begins once exhaust port 72 is closed. Within the range of angles indicated in dashed lines as Spark Angles, control unit 78 (shown in FIG. 3) energizes spark plug 76 (shown in FIG. 3) so that a spark ignites the air-fuel mixture in combustion chamber 70.

Control unit 78 utilizes a series of maps, or table, stored in memory to control fuel injection angles, fuel injection quantity, and fuel injection timing, i.e., the spark angles, in the cylinders of engine 30 (shown in FIG. 2) based on engine speed and load. In one engine, at idle speed, the pistons move from TDC to BDC and back to TDC in about 100 milliseconds. At 6000 RPM, the pistons move from TDC to BDC and back to TDC in about 10 milliseconds.

In a particular embodiment, fuel injector 74 (shown in FIG. 3) injects fuel into combustion chamber 70 for a time period of about 2 to 2.5 milliseconds. At wide open throttle (WOT), fuel is injected into chamber 70 near BDC. Since the speed of the pistons decreases as the throttle is pulled back from WOT, the angle at which fuel is injected also decreases.

Combustion in the cylinders can be switched between a stratified combustion mode and a homogenous combustion mode by retarding or advancing the fuel injection into an engine cylinder, by regulating the fuel injection quantity, and /or by changing the fuel injection timing in the cylinders. Generally, the earlier the injection angle in the piston cycle for a given fuel injection timing and fuel quantity, the more the fuel is atomized into the air in the cylinder and the more homogenous the combustion. The later the injection angle in the piston cycle for a given fuel injection timing and fuel quantity, the less atomized the fuel becomes in the cylinder and the more stratified the combustion. Stratified combustion is generally used at lower engine speeds and loads, and homogenous combustion is generally used at higher engine speeds and loads. Thus, control unit 78 controls combustion in the cylinders and causes the cylinders to switch between stratified and homogenous combustion modes. Conventionally, however, heavy soot is generated when the engine cylinders transition from stratified to homogenous combustion.

In one embodiment using step control, the engine fuel injection angle is controlled so that the soot zone is avoided. That is, the fuel injection angles for all the cylinders are the same, and when the throttle position is advanced to a position corresponding to an injection angle in the soot zone, all the cylinders are controlled so that the injection angle for each cylinder skips the soot zone at one time. In other words, all the engine cylinders are operated in the same combustion mode, and a small throttle push results in changing the fuel injection angle in all engine cylinders from angle E to angle F. Such an increase in injection angle in all the engine cylinders results in a step increase in engine RPM.

In an alternative embodiment referred to as an injection angle skip strategy, heavy soot production is avoided without significant engine RPM increases by operating the engine cylinders in a first set of throttle positions in a stratified combustion mode wherein the fuel injection angles in all the cylinders are the same. For a second set of throttle positions, the engine operates in a mixed stratified combustion and homogenous combustion mode in that the injection angles in at least one or some cylinders result in stratified combustion and the injection angles in at least one or some cylinders result in homogenous combustion. For a third set of throttle positions, the engine operates in a homogenous mode and the fuel injection angles in all the cylinders are the same.

In one embodiment employing the injection angle skip strategy, for throttle positions up to about 15.0% of wide open throttle, the injection angles in all the cylinders are the same, and the engine operates in a stratified combustion mode. Between throttle positions of about 15.0% and 27.5% of wide open throttle, one or more cylinders are controlled to operate with later injection angles and lower fueling, which results in lower torque production and lower soot formation, while at the same time the remaining cylinders are set to operate with advanced injection angles and higher fueling, which results in a homogenous mixture of air and fuel, higher torque, and also lower soot formation. Therefore, rather than operating all cylinders at the same fuel injection angle and fueling, at least one of the cylinders operates at a different injection angle than the other cylinders. That is, one cylinder may be operating at one end (e.g., injection angle F) of the soot zone and the other cylinders are operating at the other end (e.g., injection angle E) of the soot zone, rather than all cylinders operating with the same injection angle. Once the throttle position is advanced beyond 27.5% of wide open throttle, then all cylinders once again are operated at the same fuel injection angles and the engine operates in the homogenous combustion mode.

In one engine, the soot zone is located at injection angles between about 80° and 120°. Therefore, and based on throttle position, each cylinder is separately controlled to skip the soot zone, i.e., skip from an injection angle of about 80° to an injection angle of about 120°.

The chart below illustrates an injection angle skip map used in one embodiment for a six cylinder engine having a first odd cylinder back with cylinders "1," "3," and "5," and an even cylinder bank with cylinders "2," "4," and "6." The map for throttle positions, injection angles, spark injection angles, and fuel flow is stored in the memory of the control unit. During engine operations, the processor of the control unit utilizes the map to set, for example, the fuel injection angle for each cylinder based on throttle position to switch the cylinder from stratified combustion to homogenous combustion.

| Throttle Position | Cylinder # |
|---|---|
| 15.0% | 3 |
| 17.5% | 5 |
| 20.0% | 1 |
| 22.5% | 4 |
| 25.0% | 6 |
| 27.5% | 2 |

Generally, and with the mapping set forth in the above chart, the engine operates in the stratified combustion mode with throttle positions up to about 15.0% of wide open throttle. For throttle positions between about 15.0% and 27.5% of wide open throttle, the engine operates in the mixed stratified and homogenous combustion mode. For throttle positions of 27.5% of wide open throttle and greater, the engine operates in the homogenous combustion mode.

More specifically, when the throttle position is at less than 15.0% of wide open, the control unit sets the fuel injection angle in all the cylinders at a same angle and the engine operates in the stratified combustion mode. When the throttle position reaches 15.0% of wide open, the control unit causes the fuel injection angle of cylinder 3 to skip from about 80° to 120°, and cylinder 3 operates in the homogenous combustion mode. The other cylinders, however, all remain at a fuel injection angle of 80° and operate in the stratified combustion mode.

When the throttle position is advanced to 17.5% of wide open, then the control unit causes the fuel injection angle of cylinder 5 to skip from about 80° to 120°. Therefore, with the throttle at 17.5% of wide open, cylinders 3 and 5 operate with fuel injection angles of 120° and in the homogenous combustion mode, and the other cylinders operate at a fuel injection angle of 80° and in the stratified combustion mode.

Each cylinder is controlled to skip over the heavy soot formation injection angles, i.e., injection angles between 80° and 120°, based on the throttle position as described above. When the throttle position reaches 27.5% of wide open, all cylinders operate at a fuel injection angle of 120° and in the homogenous mode.

Of course, many other mapping strategies are possible. For example, the number of cylinders that skip over the soot zone at particular throttle positions can be varied (e.g., more than one cylinder can skip the soot zone at one throttle position). In addition, the particular throttle positions and the particular injection angles skipped can vary from engine to engine. The particular injection angles to skip as well as the particular throttle positions at which such skips occur can be determined empirically. Further, rather than controlling when each cylinder skips from stratified to homogenous combustion based on throttle position, such control can be based on engine RPM. The above described injection angle skip strategy provides that heavy soot production is avoided yet allows smooth engine acceleration and deceleration without significant engine RPM increases and decreases with small throttle movements.

As explained further below, however, it has been observed that, at least in some applications, such as in pontoon boats, the above-described injection angle skip strategy has been found deficient in certain engine operating ranges.

Figure 5:
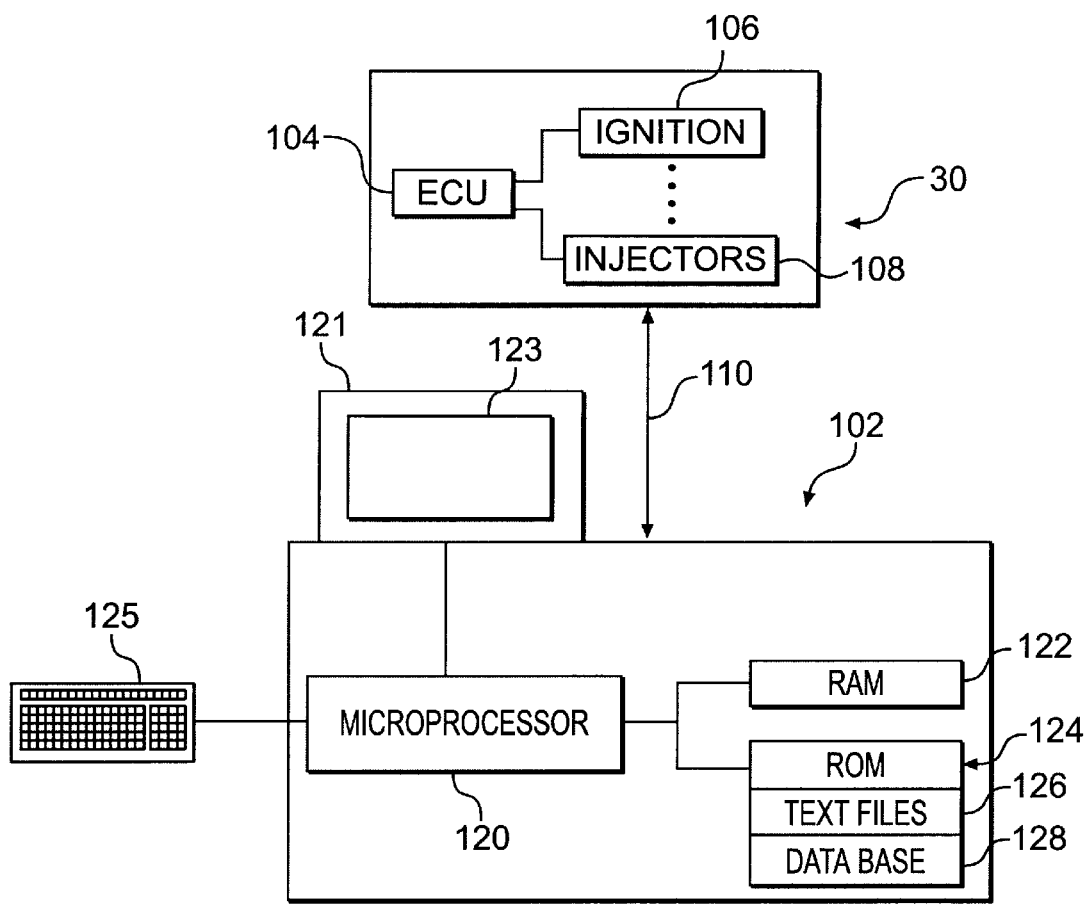
FIG. 5 is a block diagram of the engine shown in FIG. 2 coupled to an external computer.

FIG. 5 is a block diagram of engine 30 and an external computer 102 coupled to engine 30 for changing operational parameters of engine 30 to implement a universal control scheme so that engine 30 may perform optimally across different watercraft platforms.

Engine 30 includes an electronic control unit (ECU) 104 coupled to engine components such as an engine ignition system 106 and a fuel injection system 108 for igniting and injecting, respectively, fuel in the engine cylinders. Generally, ECU 104 controls operation of engine and provides information to an operator by controlling various indicator lights and gauges (not shown) at an operator's station. ECU 104 controls operation of engine 30 by, for example, controlling firing of spark plugs 76 (shown in FIG. 3) via ignition system 106 and controlling supply of fuel to fuel injectors 54 (shown in FIG. 3) via fuel injection system 108 according to predetermined values, as further described below.

Computer 102 is coupled by a command/data link 110 to ECU 104 for use by an operator or repair person for diagnostics and servicing of engine 30. Computer 102 includes a microprocessor 120 coupled to a random access memory (RAM) 122 and a read only memory (ROM) 124. In one embodiment, computer 102 also includes a monitor 121 with a display screen 123. In one embodiment, computer 102 is a battery-powered laptop computer, and processor 120 is a 286 MHz MSDOS processor. Of course, other operating systems such as MacOS, Linux or Windows NT could be used. Likewise, higher speed processors such as 386 MHz, 486 MHz, Pentium™, PentiumII™, Cyrix, AMD, Celeron or other more modern processor may be used. Computer 102 also includes, for example, a monochromatic or color display 123 and a keyboard 125 for entry of user commands and data. Many other types and models of computers can be used, and the present invention is not limited to practice in connection with any one particular type of computer.

Commands, programs and data are transmitted from microprocessor 120 to ECU 104 via link 110. For some operations, only commands will be sent and for other operations only data will be sent. Programs may be sent only on start-up or may be sent periodically as various functions are selected and activated.

ROM 124 includes text files 126 and database files 128. Files 126 and 128 are loaded into ROM from a CD, a high-capacity disk such as a "ZIP disk", "JAZZ disk" or "Super Disk", or a standard floppy disk, e.g., a 1.44 Meg 3 ½ inch floppy disk, depending primarily upon the size and complexity of data and text files transferred to ECU memory. Text files 126 contain text for various screen displays to be shown on the display of computer 102. Although the term "text files" is used, it will be understood that this term means any file containing data which can be read by computer 102 to cause the display of textual material on screen 123. Database files 128 contain the fault codes and other information to be utilized in connection with diagnostic operations and engine control schemes, including, but not limited to, fuel injection system parameters in the form of operational maps.

Computer 102, among other things, is used to change operational parameters loaded into ECU 104 for increased engine performance as desired and for certain engine applications. For example, it has been observed that in pontoon boat applications, conventional engines tends to run at relatively high RPM, e.g., about 3500 RPM to about 4500 RPM at low throttle openings, e.g., throttle openings of about 15% to about 25% of wide open throttle. In other words, the switch points for switching from stratified combustion to homogenous combustion occurs at higher RPMs. Operating the engine at higher RPMs with lower percentage throttle openings, i.e., restricted throttle openings, is less than desirable.

In one aspect of the invention, it was found that by raising the switching points for switching the cylinders in stratified combustion to homogenous combustion to higher percent of throttle opening, smoother engine operation results. For example, in a four cylinder engine, it was previously determined that a suitable switching map for a four cylinder engine having a first odd cylinder back with cylinders "1," and "3" and an even cylinder bank with cylinders "2" and "4" is as follows:

| Throttle Position | Cylinder # |
| --- | --- |
| 15.0% | 4 |
| 17.5% | 1 |
| 20.0% | 2 |
| 22.5% | 3 |

However, it has been discovered that for pontoon boats, the following switching map provides smoother engine performance:

| Throttle Position | Cylinder # |
| --- | --- |
| 20.0% | 4 |
| 24.5% | 1 |
| 28.0% | 2 |
| 32.0% | 3 |

Therefore, switching of the cylinders to homogenous combustion mode occurs at greater percentage throttle openings, i.e., at less restricted throttle openings, thereby allowing more fuel to the engine and more capably supporting homogenous combustion at higher RPMs. This result may be similarly accomplished in engines having greater than four cylinders, e.g., a six cylinder engine In alternative embodiments, the switch points set forth may be increased, for example, up to about 10% of throttle opening while achieving some or all of the above described performance advantages. For example, an alternative switching map is as follows:

| Throttle Position | Cylinder # |
| --- | --- |
| 30.0% | 4 |
| 34.5% | 1 |
| 38.0% | 2 |
| 42.0% | 3 |

Moreover, in further alternative embodiments, switch point values between those set forth above are used, such as in the following switching map illustrating acceptable switching ranges.

| Throttle Position | Cylinder # |
| --- | --- |
| 20.0% to 30.0% | 4 |
| 24.5% to 34.5% | 1 |
| 28.0% to 38.0% | 2 |
| 32.0% to 42.0% | 3 |

The above switching maps may be implemented quickly and easily by trained service personnel with appropriate equipment, such as computer 102, to improve engine operation and performance for pontoon boat applications.

While the invention has been described in terms of various specific embodiments, those skilled in the art will recognize that the invention can be practiced with modification within the spirit and scope of the claims.

What is claimed is:

1. A control unit for an internal combustion engine, wherein the internal combustion engine includes an engine block comprising a plurality of cylinders, wherein each of the plurality of cylinders are operable in one of a homogenous combustion mode and a stratified combustion mode in response to an engine throttle position, wherein the control unit is operable to control each of the plurality of cylinders to operate in the stratified combustion mode when the throttle position is between 0% and approximately 20% of a wide open throttle position; and wherein the control unit is operable to switch one of the plurality of cylinders to the homogenous combustion mode when the throttle position is approximately 20% of the wide open throttle position.

2. The control unit in accordance with claim 1, wherein the control unit is operable to control at least one of the plurality of cylinders in the homogeneous combustion mode and at least one of the plurality of cylinders in the stratified combustion mode when the throttle position is between approximately 20% and approximately 42% of the wide open throttle position.

3. The control unit in accordance with claim 2, wherein the control unit is operable to control each of the plurality of cylinders to operate in the homogenous combustion mode when the throttle position is greater than approximately 42% of the wide open throttle position.

4. The control unit in accordance with claim 3, wherein the internal combustion engine includes at least a first cylinder, a second cylinder, a third cylinder, and a fourth cylinder, wherein the control unit is operable to switch the first cylinder from the stratified combustion mode to the homogenous combustion mode when the throttle position is between approximately 20% and approximately 30% of the wide open throttle position;

switch the second cylinder from the stratified combustion mode to the homogenous combustion mode when the throttle position is between approximately 24.5% and approximately 34.5% of the wide open throttle position;

switch the third cylinder from the stratified combustion mode to the homogenous combustion mode when the throttle position is between approximately 28.0% and approximately 38.0% of the wide open throttle position; and switch the fourth cylinder from the stratified combustion mode to the homogenous combustion mode when the throttle position is between approximately 32% and approximately 42% of the wide open throttle position.

5. The control unit in accordance with claim 4, wherein the control unit is operable to switch the first cylinder from the stratified combustion mode to the homogenous combustion mode at when the throttle position is approximately 20% of the wide open throttle position;

switch the second cylinder from the stratified combustion mode to the homogenous combustion mode when the throttle position is approximately 24.5% of the wide open throttle position;

switch the third cylinder from the stratified combustion mode to the homogenous combustion mode when the throttle position is approximately 28.0% of the wide open throttle position; and switch the fourth cylinder from the stratified combustion mode to the homogenous combustion mode when the throttle position is approximately about 32% of the wide open throttle position.

6. A two stroke internal combustion engine comprising:

a plurality of direct injected cylinders, wherein each of the plurality of cylinders is operable in a homogenous combustion mode and a stratified combustion mode; and an electronic control unit operatively coupled to each of the plurality of cylinders, wherein the electronic control unit is operable to control each of the plurality of cylinders to operate in the stratified combustion mode at a throttle position between 0% and approximately 20% of wide open throttle and switch one of the plurality of cylinders to the homogenous combustion mode when the throttle position is approximately 20% of the wide open throttle position.

7. The engine accordance with claim 6, wherein the electronic control unit is operable to control at least one of the plurality of cylinders in the homogeneous combustion mode and at least another of the plurality of cylinders in the stratified combustion mode at throttle positions of approximately 20% to approximately 42% of the wide open throttle position.

8. The engine in accordance with claim 7, wherein the electronic control unit is operable to control each of the plurality of cylinders to operate in the homogenous combustion mode when the throttle position is greater than approximately 42% of the wide open throttle position.

9. The engine in accordance with claim 8, wherein the plurality of cylinders comprises at least a first cylinder, a second cylinder, a third cylinder, and a fourth cylinder, wherein the electronic control unit is operable to switch the first cylinder from the stratified combustion mode to the homogenous combustion mode when the throttle position is between approximately 20% and approximately 30% of the wide open throttle position;

switch the second cylinder from the stratified combustion mode to the homogenous combustion mode when the throttle position is between approximately 24.5% and approximately 34.5% of the wide open throttle position;

switch the third cylinder from the stratified combustion mode to the homogenous combustion mode when the throttle position is between approximately 28.0% and approximately 38.0% of the wide open throttle position; and switch the fourth cylinder from the stratified combustion mode to the homogenous combustion mode when the throttle position is between approximately 32% and approximately 42% of the wide open throttle position.

10. The engine in accordance with claim 9, wherein the electronic control unit is operable to switch the first cylinder from the stratified combustion mode to the homogenous combustion mode when the throttle position is approximately 20% of the wide open throttle position;

switch the second cylinder from the stratified combustion mode to the homogenous combustion mode when the throttle position is approximately 24.5% of the wide open throttle position;

switch the third cylinder from the stratified combustion mode to the homogenous combustion mode when the throttle position is approximately 28.0% of the wide open throttle position; and switch the fourth cylinder from the stratified combustion mode to the homogenous combustion mode when the throttle position is approximately 32% of the wide open throttle position.

11. A method for controlling an internal combustion engine including a plurality of cylinders operable in a homogenous combustion mode and a stratified combustion mode, each of the cylinders being operatively coupled to an electronic control unit, the electronic control unit being operable to switch each of the cylinders between the homogenous combustion mode and the stratified combustion mode based upon an engine throttle position, said method comprising:

controlling each of the cylinders to operate in the stratified combustion mode; and switching one of the cylinders to the homogenous combustion mode when the engine throttle position exceeds approximately 20% of a wide open throttle position.

12. The method in accordance with claim 11 further comprising switching another of the cylinders to the homogenous combustion mode when the engine throttle position exceeds approximately 24.5% of the wide open throttle position.

13. The method in accordance with claim 11 further comprising switching another of the cylinders to the homogenous combustion mode when the engine throttle position exceeds approximately 28% of the wide open throttle position.

14. The method in accordance with claim 11 further comprising switching another of the cylinders to the homogenous combustion mode when the engine throttle position exceeds approximately 32% of the wide open throttle position.

15. A method for operating an internal combustion engine for a pontoon boat, the engine including a plurality of cylinders operable in a homogenous combustion mode and a stratified combustion mode, each of the cylinders operatively couple to an electronic control unit, the electronic control unit configured to switch each of the cylinders between the homogenous combustion mode and the stratified combustion mode based upon an engine throttle position, said method comprising:

controlling each of the cylinders to operate in the stratified combustion mode; and switching one of the cylinders to the stratified combustion mode when the throttle position is between approximately 20% and approximately 30% of a wide open throttle position.

16. The method in accordance with claim 15 wherein the engine includes at least four cylinders, said method further comprising operating each of the four cylinders in the homogenous combustion mode when the throttle position is between approximately 32% and approximately 42% of the wide open throttle position.

17. An internal combustion engine for a pontoon boat, comprising:

a plurality of engine cylinders operable in a stratified combustion mode and a homogenous combustion mode; and an electronic controller coupled to each of the plurality of cylinders, wherein the electronic control unit is operable to operate each of the engine cylinders in the stratified combustion mode at a throttle position between 0% and approximately 20% of a wide open throttle position and switch at least one of the engine cylinders from the stratified combustion mode to the homogenous combustion mode when the throttle position is between approximately 20% and approximately about 42% of the wide open throttle position.

18. The engine in accordance with claim 17, wherein the engine includes at least four cylinders.

19. The engine in accordance with claim 18, wherein the electronic control unit is operable to operate each of the engine cylinders in the homogenous combustion mode when the throttle position is above approximately 42% of the wide open throttle position.

20. The engine in accordance with claim 17, wherein each of the cylinders is a direct injected cylinder.

* * * * *